United States Patent
Salle et al.

(10) Patent No.: US 8,984,347 B2
(45) Date of Patent: Mar. 17, 2015

(54) REAL-TIME TRIGGER SEQUENCE CHECKER

(71) Applicant: Scaleo Chip, Valbonne, Sophia Antipolis (FR)

(72) Inventors: Bruno Salle, Marseilles (FR); Eric Miniere, Grasse (FR)

(73) Assignee: Scaleo Chip, Valbonne, Sophia Antipolis (FR)

(*) Notice: Subject to any disclaimer, the term of this patent is extended or adjusted under 35 U.S.C. 154(b) by 112 days.

(21) Appl. No.: 13/653,773

(22) Filed: Oct. 17, 2012

(65) Prior Publication Data

US 2014/0108856 A1 Apr. 17, 2014

(51) Int. Cl.
*G06F 11/00* (2006.01)

(52) U.S. Cl.
USPC ............................................. 714/39; 714/6.11

(58) Field of Classification Search
CPC .................................................... G06F 11/273
USPC ........................ 714/6.11, 30, 39, 48, 733, 734
See application file for complete search history.

(56) References Cited

U.S. PATENT DOCUMENTS

| | | | |
|---|---|---|---|
| 4,434,488 A | 2/1984 | Palmquist et al. | |
| 5,654,657 A | 8/1997 | Pearce | |
| 6,178,525 B1* | 1/2001 | Warren | 714/37 |
| 6,396,517 B1 | 5/2002 | Beck et al. | |
| 6,615,369 B1* | 9/2003 | Beck et al. | 714/39 |
| 6,850,852 B1* | 2/2005 | Ferguson et al. | 702/67 |
| 7,921,333 B2 | 4/2011 | Smith et al. | |
| 2004/0120352 A1* | 6/2004 | Jungerman | 370/503 |
| 2006/0179354 A1 | 8/2006 | Dippon | |
| 2012/0144240 A1 | 6/2012 | Rentschler et al. | |
| 2012/0317533 A1* | 12/2012 | Zawalski et al. | 716/136 |

OTHER PUBLICATIONS

Advanced RISC Machines LTD (ARM), "AMBA Advanced Microcontroller Bus Architecture Specification", Document No. ARM IHI 0001 D, (Apr. 1997), 112 pp. total.
Cheung, Peter, "Topic 10 Bus Architecture & Interconnects", Imperial College London, Department of Electrical & Electronic Engineering, (Mar. 2006), 29 pp. total.
Chillarege, Ram, et al., "Software Triggers as a Function of Time—ODC on Field Faults", *IBM Thomas J. Watson Research Center*, (1995), 15 pp. total.

* cited by examiner

*Primary Examiner* — Dieu-Minh Le
(74) *Attorney, Agent, or Firm* — Blakely Sokoloff Taylor & Zafman LLP

(57) ABSTRACT

A system, and in particular a system operating in real-time, may have its operation rely on a particular sequence of trigger signals, hardware or software, for proper operation. A trigger sequence checker provides a way to monitor in real-time predetermined sequences of triggers and is configured to generate an error signal upon detection of a faulty operation or sequence. Rules for sequences of triggers are stored in memory and are used by the trigger sequence checker to verify one or more sequences of triggers received as an input to the checker. A plurality of triggers may be handled by the checker. In one embodiment the checker is configurable to be set in a learning mode to capture triggers rules.

14 Claims, 2 Drawing Sheets

REAL-TIME TRIGGER SEQUENCE CHECKER

BACKGROUND OF THE INVENTION

1. Field of the Invention

The invention generally relates to control systems and more particularly to control systems having a plurality of trigger signals operating in a predetermined sequence.

2. Prior Art

Various real-time control systems rely on a sequence of trigger signals, also referred simply as triggers, for proper operation. In some cases the sequence is critical, for example in various vehicle control systems that are part of the safety systems of the vehicle. Typically, checking that the operation of a system with respect to a specific sequence of triggers is correct is difficult and can be actually performed only on live systems operating many millions of cycles of operation. Moreover, it is possible that a fault in response of a system respective to a series of triggers would not be checked prior to the release of the system or subsystem to the market. Using simulation techniques to attempt predict such faulty a sequence is difficult, time consuming and suffers from inaccuracies.

It would be therefore advantageous to provide a solution that overcomes the deficiencies of the prior art, and particularly to provide a fault indication in real-time.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION OF THE PREFERRED EMBODIMENTS

A system, and in particular a system operating in real-time, may have its operation rely on a particular sequence of trigger signals, hardware or software, for proper operation. A trigger sequence checker provides a way to monitor in real-time predetermined sequences of triggers and is configured to generate an error signal upon detection of a faulty operation or sequence. Rules for sequences of triggers are stored in memory and are used by the trigger sequence checker to verify one or more sequences of triggers received as an input to the checker. A plurality of triggers may be handled by the checker. In one embodiment the checker is configurable to be set in a learning mode to capture triggers rules.

Figure 1:
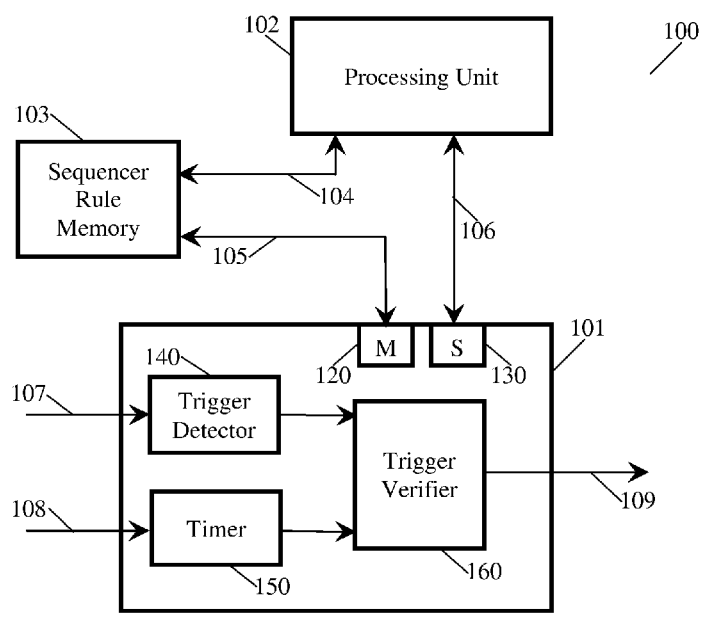
FIG. 1 is a block diagram of a system having a real-time trigger sequence checker according to an embodiment.

Reference is made to FIG. 1 that depicts an exemplary and non-limiting block diagram of a system 100 having a real-time trigger sequence checker (TSC) 101 according to an embodiment. The system 100 comprises a processing unit 102 coupled to the TSC 101. A sequence rule memory (SRM) 103 is coupled to the processing unit 102 and the TSC 101. The processing unit may be further coupled to a memory (not shown) that contains instructions stored therein. Such instructions, when executed by the processing unit 102, perform at least some of the functions described herein. The processing unit 102 is coupled to the SRM 103 with a read/write interface 104, i.e., it is capable to perform read and write operations on the SRM 103. The SRM 103 is coupled to the TSC 101 by a bus 105 that is coupled to a master interface 120 of TSC 101. This is used by the TSC 101 to read trigger sequences rules from SRM 103. SRM 103 may be of a variety of types of memories, for example, and without limitation, static random access memory (SRAM), dynamic random access memory (DRAM), non-volatile memory (NVM), and the likes. The TSC 101 is configured for operation by the processing unit 102 via a bus 106.

The TSC 101 comprises a plurality of elements. A slave interface 130 is used to couple the TSC 101 to the processing unit 102 via the bus 106. Over the slave interface 130 the TSC 101 is configured for its specific operation, i.e., TSC 101 is a configurable device. A master interface 120 is used to couple the TSC 101 to the SRM 103 via bus 105. The TSC 101 reads through the master interface 120 one or more rules with respect of trigger signals, also referred to herein as triggers, received by the TSC 101, that enable the determination of error conditions with respect of the received sequence of triggers over interface 107. A trigger may be one or more hardware triggers, one or more software triggers or any combination thereof. A hardware trigger signal is a trigger that is received as a physical signal. A software trigger signal is typically a data in the form of, for example, a bit, a byte, a word or a double-word, that is interpreted as a trigger. Interface 107 may provide N triggers where N is an integer having a value starting with N=1 and greater. The interface 107 comprises receipt of triggers that are detected by a trigger detector 140. Interface 107 may comprise a single line configured to receive a plurality of different triggers based, for example, on a particular timing scheme, or comprise a plurality of lines, each serving one or more triggers. The trigger detector 140 detects changes in the triggers and provides them to the trigger verifier 160. Trigger verifier 160, based on the rule provided from SRM 103 and the configuration of the TSC 101, verifies the correctness of the trigger sequences, and generates an error signal on interface 109 when appropriate, typically when a trigger sequence does not conform to any of the respective rules stored in the SRM 103. The error signal may be an interrupt signal. It should be noted that the error signal is generated when at least one of the following occurs: the sequence of triggers is not consistent with at least a rule; or, there is a timing error between at least two triggers that does not conform with at least a rule.

In addition there is also a clock interface 108 that couples to a timer 150. The timer 150 provides a signal to the trigger verifier 160 to further check the trigger sequence and its conformance or non-conformance to the trigger sequence rules. While a single clock input is shown herein a plurality of clocks are envisioned without departing from the scope of the invention. The timer is further used in a timing learning mode discussed in more detail herein below.

To further understand the principles of operation of a TSC 101 configured according to the invention, there are now provided a couple of non-limiting examples. Those of ordinary skill in the art would appreciate that other examples may be provided without departing from the scope of the invention. In a first non-limiting example (FIG. 2.) a trigger $T_1$ is provided on the trigger input 107. The valid sequence for receiving the trigger $T_1$ is as follows:

$T_1$ goes high for a period $t_1$;

$T_1$ goes low for a period of at least $t_2$ but not more than $t_3$;

$T_1$ goes high for a period $t_4$; and $T_1$ goes low for a period of at least $t_5$.

Figure 2:
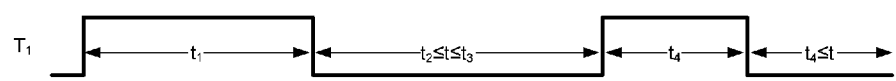
FIG. 2 is a schematic view of a first valid triggering sequence for a trigger $T_1$ according to an embodiment.

FIG. 2 shows an exemplary and non-limiting schematic view of a first valid triggering sequence for a trigger $T_1$ according to the embodiment described above. In this case, a non-valid sequence would be, for example, a sequence where if after $T_1$ going high for a period of $t_1$ it goes low for a period that is longer than $t_3$. This sequence rule for trigger $T_1$ is stored in the SRM 103 and retrieved by TSC 101 over interface 105 and then verified, by the trigger verifier 160 of TSC 101 that also uses the timer 150 for that purpose, against the actual trigger received on interface 107. If the trigger sequence of T1 is different from the expected sequence stored in the SRM 103 an error signal is generated on signal 109.

In a second non-limiting example (FIG. 3), TSC 101 receives two trigger signals $T_2$ and $T_3$ on interface 107. The valid sequence for receiving the triggers $T_2$ and $T_3$ is as follows:

$T_2$ goes high for a period $t_6$;

$T_3$ goes high for a period of $t_7$ before a change in $T_2$, i.e., before period $t_6$ expires;

$T_2$ goes low for a period of at least $t_8$; and $T_3$ goes low for a period of at least $t_9$.

Figure 3:
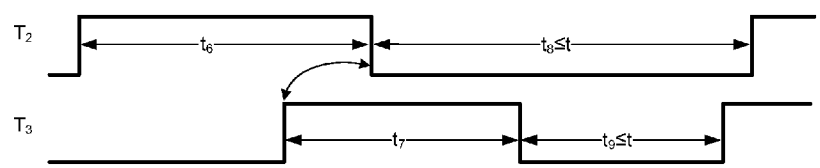
FIG. 3 is a schematic view of a second valid triggering sequence for trigger $T_2$ and $T_3$ according to an embodiment.

FIG. 3 shows an exemplary and non-limiting schematic view of the second valid triggering sequence for triggers $T_2$ and $T_3$ according to the embodiment described above. In this case, a non-valid sequence would be, for example, a sequence where $T_3$ goes high when $T_2$ was high for a period of time that is different from $t_6$. This sequence rules for triggers $T_2$ and $T_3$ are stored in the SRM 103 and retrieved by TSC 101 over interface 105 and then verified, by the trigger verifier 160 of TSC 101 that also uses the timer 150 for that purpose, against actual triggers received on interface 107. In an embodiment of the invention it is possible to define the absence of a trigger at a certain period of time, as well as other combinations. Each such sequence stored in SRM 103 is referred to typically as a sequence rule or in short, a rule. It should be understood that while the description hereinabove refers to hardware triggers, other triggers that are a result of a sequence of instructions executed by a processing unit, including but not limited to processing unit 102, are also possible and are referred to as software triggers.

In an embodiment the sequencer checker 100 may be configured to operate in a timing learning mode. In this mode the sequence checker 100 estimates timing constraints for a given sequence of triggers. This mode of operation allows to better characterize the timing constraints of a sequence of triggers. In this mode of operation the sequencer checker, rather than checking timing constraints of triggers, it gathers timing information respective of a sequence of triggers. In one embodiment the triggers to be measured for timing are defined in rules within memory 103. It should be understood, and without limiting the scope of the invention, that in the learning mode tolerances may be added when rules are developed. That is, with respect to a particular signal a tolerance may be allowed that would still be considered to be the same sequence despite to not accurately follow an ideal signal. This is of particular importance when the likes of mechanical and/or electromechanical devices inject triggers into the system. In such cases response times may drift due to manufacturing tolerances, as the component ages, and particularly with temperature and other environmental differences. The timing results are also stored in memory, for example, memory 103 and may be used to develop more advanced rules that include timing information.

Figure 4:
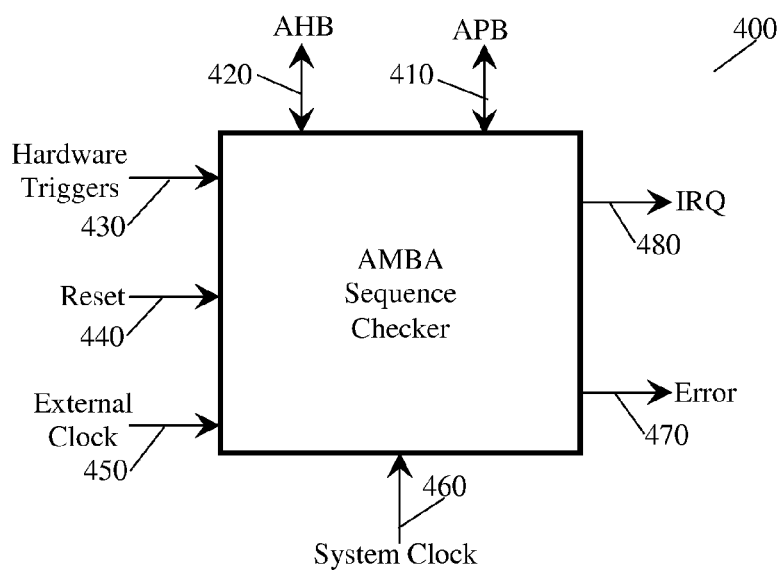
FIG. 4 is an interface diagram of an embodiment of a sequence checker according to an embodiment.

FIG. 4 is an exemplary and non-limiting interface diagram of an advanced microcontroller bus architecture (AMBA) sequence checker 400 implemented in accordance with principles of the invention. The interface to a processing unit may be performed by an advanced peripheral bus (APB) 410 where the processing unit can write or read the AMBA sequencer checker configuration registers. The interface to a memory containing the sequence rules may be performed by advanced high-performance bus (AHB) 420 where the AMBA sequencer checker can read the memory. The hardware triggers interface 430 provides for connection of one or more triggers to the AMBA sequence checker 400. This may be a single line where a trigger is identified based on a particular timing or a plurality of lines, each line serving one or more particular triggers. A reset signal 440 allows for the hardware reset of the AMBA sequencer checker 400. This allows resetting of the AMBA sequencer checker 400 and reconfiguring it for the purpose of handling sequences of triggers in a different manner. Interfaces 450 and 460 provide clock interfaces that may be used by the AMBA sequencer checker 400 to determine when a sequence of trigger complies with or does not comply with one or more sequence rules stored in memory and accessible to the AMBA sequencer checker 400. An error signal 470 is generated upon detection of a sequence of triggers that does not comply with at least a sequence rule stored in a memory accessible to the AMBA sequencer checker 400. In addition, in one embodiment of the invention there is an interrupt (IRQ) signal 480 that is generated by the AMBA sequencer checker 400. Such an interrupt may be generated upon meeting certain conditions to which the AMBA sequencer checker 400 configured. One of ordinary skill in the art would appreciate that AMBA is a de facto standard used for on-chip communication. Specifically, AMBA® is an open standard defining on-chip connectivity and management of function blocks, typically in a system-on-chip (SoC) implementation.

While the disclosed invention is described hereinabove with respect to specific exemplary embodiments it is noted that other implementations are possible that provide the advantages described hereinabove, and which do not depart from the spirit of the inventions disclosed herein. Such embodiments are specifically included as part of this invention disclosure which should be limited only by the scope of its claims. Furthermore, the apparatus disclosed in the invention may be implemented as a semiconductor device on a monolithic semiconductor. The apparatus disclosed in the invention may be implemented, in one non-limiting embodiment, as a semiconductor module as part of a System-On-Chip (SoC) semiconductor device on a monolithic semiconductor. Other embodiments of the apparatus may be also implemented without departing from the scope of the disclosed invention. It should be further noted that a trigger may be used for feedback purposes. Specifically, an error signal may be a trigger for the system.

What is claimed is:

1. A trigger sequence checker (TSC) comprising:
   a first interface to a memory containing at least a rule respective of at least a trigger signal;
   a trigger detector for receiving the at least a trigger signal;
   a timer for receiving at least a clock signal; and
   a trigger verifier coupled to the trigger detector and the timer and configured to generate an error signal if a sequence respective of the at least a trigger signal is inconsistent with the at least a rule provided from the memory.

2. The TSC of claim 1, further comprising:
a second interface to at least a processing unit for configuration of the TSC.

3. The TSC of claim 1, further comprising:
a reset signal input for resetting the TSC responsive to a reset signal.

4. The TSC of claim 1, wherein a rule comprises a sequence of events respective of the at least a trigger signal.

5. The TSC of claim 4, wherein an event is one of: a timing between the at least a trigger signal and a subsequent trigger signal, or a subsequent trigger signal to the at least a trigger signal.

6. The TSC of claim 1, wherein the at least a trigger signal is one of: a hardware trigger signal, a software trigger signal.

7. The TSC of claim 1, wherein the memory is one of: volatile memory, non-volatile memory.

8. The TSC of claim 1, wherein the TSC uses an advanced microcontroller bus architecture (AMBA).

9. The TSC of claim 8, wherein the first interface is one of: an advanced high-performance bus (AHB) according to AMBA, or an advanced peripheral bus (APB) according to AMBA.

10. The TSC of claim 1, wherein the error signal is an interrupt signal.

11. The TSC of claim 1, wherein being inconsistent with the at least a rule comprises being inconsistent with at least one of: a sequence of triggers, a timing between triggers.

12. The TSC of claim 1, wherein the TSC is configurable to operate in a learning mode.

13. The TSC of claim 12, wherein when in the learning mode the TSC generates rules with respect of timing between triggers that are stored as rules in the memory.

14. A system-on-chip (SoC) comprising the TSC of claim 1.

* * * * *